US012621406B2

(12) United States Patent
Benson et al.

(10) Patent No.: US 12,621,406 B2
(45) Date of Patent: May 5, 2026

(54) OUTPUT OF VIDEO STREAMS AT MULTIPLE RESOLUTIONS

(71) Applicant: Hewlett-Packard Development Company, L.P., Spring, TX (US)

(72) Inventors: Roger Dale Benson, Spring, TX (US); Richard ShiJian Lin, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/699,046

(22) PCT Filed: Oct. 13, 2021

(86) PCT No.: PCT/US2021/054843
§ 371 (c)(1),
(2) Date: Apr. 5, 2024

(87) PCT Pub. No.: WO2023/063945
PCT Pub. Date: Apr. 20, 2023

(65) Prior Publication Data
US 2024/0422287 A1     Dec. 19, 2024

(51) Int. Cl.
*H04N 7/01* (2006.01)
*H04N 7/14* (2006.01)
*H04N 7/15* (2006.01)

(52) U.S. Cl.
CPC .......... *H04N 7/0117* (2013.01); *H04N 7/147* (2013.01); *H04N 7/15* (2013.01)

(58) Field of Classification Search
CPC ......... H04N 7/0117; H04N 7/147; H04N 7/15
See application file for complete search history.

(56) References Cited

U.S. PATENT DOCUMENTS

| | | | |
|---|---|---|---|
| 2009/0161755 A1 | 6/2009 | Gordon et al. | |
| 2013/0201279 A1 | 8/2013 | Civanlar et al. | |
| 2014/0247320 A1* | 9/2014 | Dahle | H04N 7/15 348/14.08 |

FOREIGN PATENT DOCUMENTS

| | | |
|---|---|---|
| CN | 101257607 A | 9/2008 |
| WO | 2010/074826 A1 | 7/2010 |

* cited by examiner

*Primary Examiner* — Yassin Alata
(74) *Attorney, Agent, or Firm* — Quarles & Brady LLP

(57) ABSTRACT

According to examples, an apparatus may include a video switch, a video scaler, and a video splitter. The video splitter may access an input video stream, in which the input video stream is at a first resolution, split the accessed input video stream into a first video stream and a second video stream, send the first video stream to be displayed at the first resolution through the video switch, and send the second video stream to the video scaler. The video scaler may scale the second video stream to a second resolution that differs from the first resolution and output the scaled second video stream to be displayed at the second resolution.

20 Claims, 3 Drawing Sheets

METHOD
300

RECEIVE, BY A VIDEO SPLITTER, AN INPUT VIDEO STREAM
302

SPLIT, BY THE VIDEO SPLITTER, THE INPUT VIDEO STREAM INTO A FIRST VIDEO STREAM AND A SECOND VIDEO STREAM
304

SEND, BY THE VIDEO SPLITTER, THE FIRST VIDEO STREAM AND THE SECOND VIDEO STREAM
306

OUTPUT, BY A VIDEO SWITCH, THE FIRST VIDEO STREAM TO A LOCAL DISPLAY DEVICE
308

SCALE, BY A VIDEO SCALER, THE SECOND VIDEO STREAM
310

SEND, BY THE VIDEO SCALER, THE SCALED VIDEO STREAM
312

ENCODE, BY A VIDEO ENCODER, THE SCALED VIDEO STREAM
314

OUTPUT, BY THE VIDEO ENCODER, THE ENCODED SCALED VIDEO STREAM
316

METHOD
300

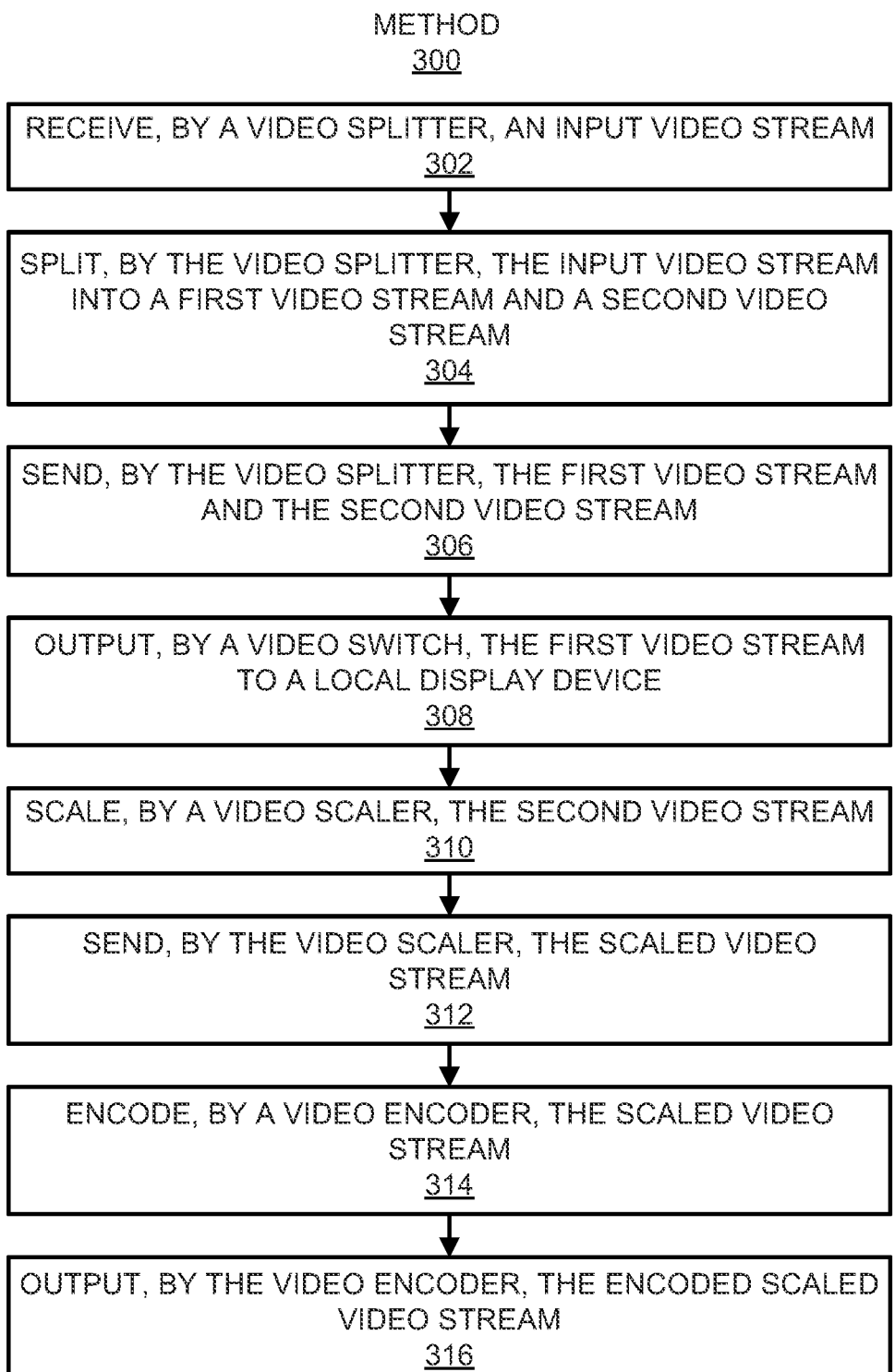

RECEIVE, BY A VIDEO SPLITTER, AN INPUT VIDEO STREAM
302

SPLIT, BY THE VIDEO SPLITTER, THE INPUT VIDEO STREAM INTO A FIRST VIDEO STREAM AND A SECOND VIDEO STREAM
304

SEND, BY THE VIDEO SPLITTER, THE FIRST VIDEO STREAM AND THE SECOND VIDEO STREAM
306

OUTPUT, BY A VIDEO SWITCH, THE FIRST VIDEO STREAM TO A LOCAL DISPLAY DEVICE
308

SCALE, BY A VIDEO SCALER, THE SECOND VIDEO STREAM
310

SEND, BY THE VIDEO SCALER, THE SCALED VIDEO STREAM
312

ENCODE, BY A VIDEO ENCODER, THE SCALED VIDEO STREAM
314

OUTPUT, BY THE VIDEO ENCODER, THE ENCODED SCALED VIDEO STREAM
316

FIG. 3

OUTPUT OF VIDEO STREAMS AT MULTIPLE RESOLUTIONS

BACKGROUND

Remote (or virtual) conferencing meetings have become more prevalent. In addition, video content is often shared with participants in the remote conference meetings. In some instances, the conference meetings include both local and remote participants, in which a presenter may be located in a common conference room with the local participants. In these instances, the same video content may be shared with both the local and remote participants.

BRIEF DESCRIPTION OF DRAWINGS

Features of the present disclosure are illustrated by way of example and not limited in the following figure(s), in which like numerals indicate like elements, in which:

FIG. 3 depicts a flow diagram of an example method for outputting received video content concurrently at multiple resolutions.

DETAILED DESCRIPTION

Figure 1:
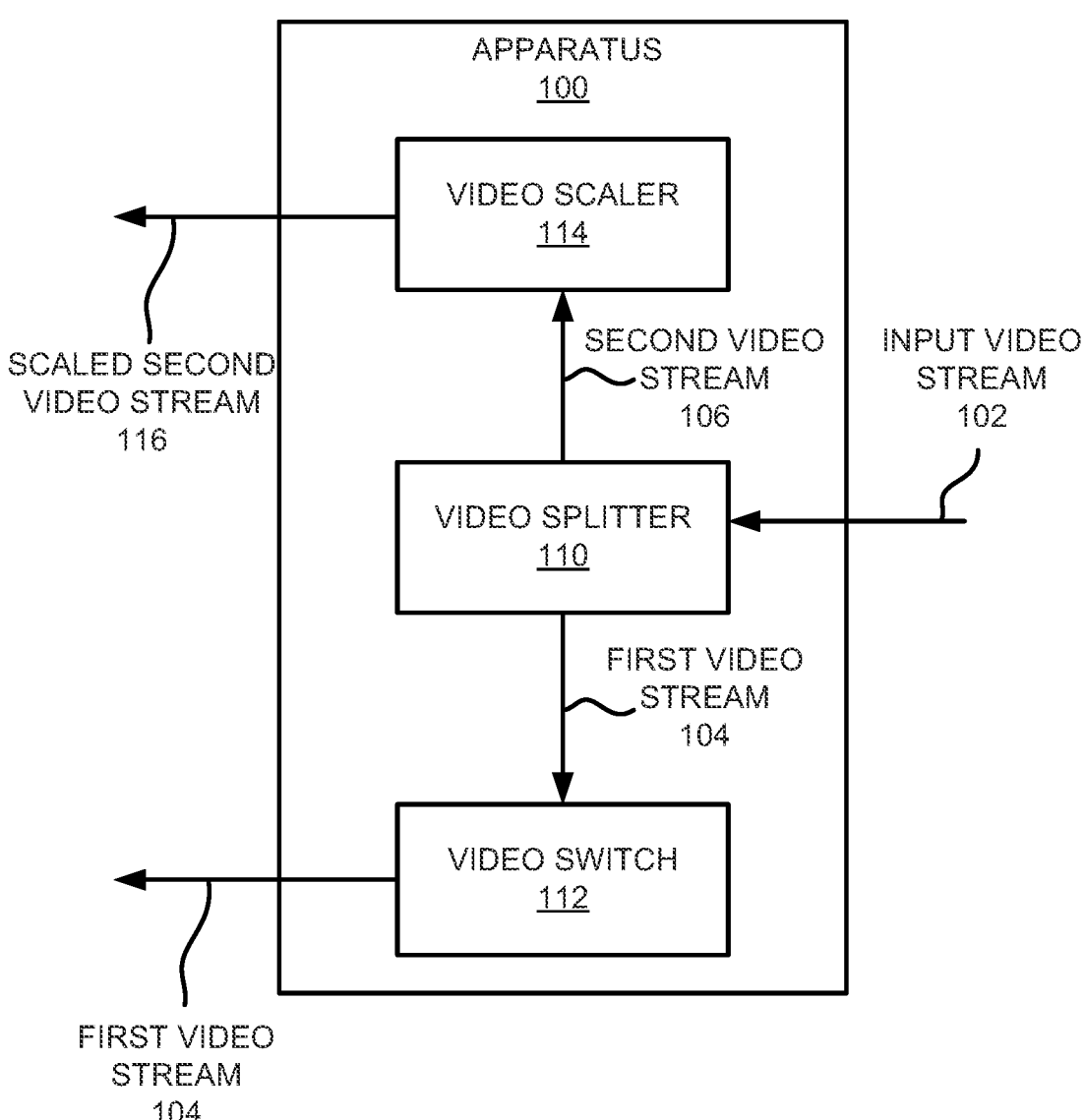
FIG. 1 shows a block diagram of an example apparatus that is to cause an input video stream to be split into a first video stream and a second video stream, in which the second video stream may be displayed at a different resolution than the first video stream.

For simplicity and illustrative purposes, the principles of the present disclosure are described by referring mainly to examples thereof. In the following description, numerous specific details are set forth in order to provide an understanding of the examples. It will be apparent, however, to one of ordinary skill in the art, that the examples may be practiced without limitation to these specific details. In some instances, well known methods and/or structures have not been described in detail so as not to unnecessarily obscure the description of the examples. Furthermore, the examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Some conferencing meetings may include both local and remote participants such that, for instance, the local participants may be in a common conference room with a presenter while the remote participants may be in a virtual conferencing meeting. For example, the remote participants may participate in the virtual conferencing meeting through execution of a video conferencing application on their local computing devices. In some instances, a presenter may wish to simultaneously display video content to the local participants on a display device in the conference room and on remote display devices of the remote participants.

In order to achieve this simultaneous display of the video content, the video content may be downscaled. Particularly, the video content may be downscaled and encoded such that the video content may be outputted through the video conferencing application. The same downscaled and encoded video content may be displayed on the display device in the conference room. As a result, the participants in the local conference room may not be provided with the video content in its original resolution and/or at a higher resolution than the video content provided to the remote participants. In other instances, the video content may be displayed to the local display device at the higher resolution without the video content being sent to the remote participants. As a result, the participants in the local conference room may not be able to view the video content at the resolution intended by the presenter, which may reduce an experience by the local participants.

Disclosed herein are apparatuses, systems, and methods for allowing meeting presenters to share a high-resolution version of video content with local participants while concurrently providing remote participants with a lower-resolution version of the same video content. The apparatuses disclosed herein may include a video scaler, a video encoder, and a video switch. The video splitter may access an input video stream and may split the input video stream into a first video stream and a second video stream. The first video stream may be sent to the video switch, which may output the first video stream to a local display device. The second video stream may be sent to the video scaler, which may downscale the second video stream to a scaled version of the second video stream. The scaled version of the second video stream may be sent to the video encoder, which may encode the scaled version of the second video stream. The encoded scaled version of the second video stream may be sent to a computing device on which a video conferencing application may be executing such that the video conferencing application may stream the encoded scaled version of the second video stream remotely, e.g., over the Internet.

Through implementation of the features of the present disclosure, the first video stream may be at a higher resolution than the encoded scaled version of the second video stream. Thus, for instance, the higher resolution first video stream may be displayed on a display device to local participants of a videoconferencing meeting and the lower resolution encoded scaled version of the second video stream may be displayed on display devices of remote participants. Accordingly, local participants of a meeting that is also being outputted virtually to remote participants may be provided with a higher resolution version of video content while the remote participants of the meeting may be provided with a lower resolution version of the same video content. The lower resolution version of the video content may, for instance, be a highest level of resolution available through the video conferencing application.

In the present disclosure, the input video stream, the first video stream, and the second video stream may equivalently be termed the input video stream data, the first video stream data, and the second video stream data, respectively. In this regard, the streaming of the video content may equivalently be described as the streaming of data representing or corresponding to the video content.

Reference is first made to FIG. 1, which shows a block diagram of an example apparatus 100 that is to cause an input video stream 102 to be split into a first video stream 104 and a second video stream 106, in which the second video stream 106 may be displayed at a different resolution than the first video stream 104. It should be understood that the example apparatus 100 may include additional features and that some of the features described herein may be removed and/or modified without departing from the scope of the apparatus 100.

Generally speaking, the apparatus 100 may be employed in a conference environment in which there may be both local and remote participants of a meeting. The local participants of the meeting may be those participants who are located within a conference room at which a source of an input video stream is located. The remote participants of the meeting may be those participants who are located outside of the conference room and are thus remote from the source of the input video stream. For instance, the remote participants may view a version of the input video stream through execution of a video conferencing application on their devices. The video conferencing application may enable the input video stream as well as, for instance, video and audio of speakers captured in the conference room to be streamed to the devices of the remote participants.

According to examples, the apparatus 100 may split the input video stream 102 into a first video stream 104 and a second video stream 106. The apparatus 100 may direct the first video stream 104 to be displayed to the local participants, for instance, on a monitor (or multiple monitors), by a projector (or multiple projectors), or combinations thereof. The apparatus 100 may also direct the second video stream 106 to be outputted via the video conferencing application to devices of the remote participants. As a result, execution of the video conferencing application on the display devices of the remote participants may cause the second video stream 106 to be displayed on the display devices of the remote participants.

In some instances, the first video stream 104 may be at a first resolution and the second video stream 106 may be at a second resolution that may differ from the first resolution. For instance, the first resolution may be higher than the second resolution such that the video stream displayed to the local participants may be at a higher resolution level than the video stream displayed to the remote participants. By way of particular example, the video stream displayed to the local participants may be displayed at the same resolution as, e.g., a native resolution of, the input video stream 102. In addition, the video stream displayed to the remote participants may be at a resolution that may correspond to the input video stream 102 being encoded for transmission of the data corresponding to the input video stream 102 over a network, such as the Internet. In some examples, a presenter, e.g., a source of the input video stream 102, may drive higher resolution video content to be displayed to the local participants while concurrently allowing remote participants to view a lower resolution version of the same content.

The apparatus 100 may be a card that may be added onto a computing device, such as a personal computer, a laptop computer, a tablet computer, and/or the like. For instance, the apparatus 100 may be an expansion card, an interface card, and/or the like. In these examples, the apparatus 100 may be inserted into an expansion slot in the computing device or otherwise connected to the computing device. In other examples, the apparatus 100 may be a dongle that may be inserted into a computing device such as, for instance, into a universal serial bus (USB) port of the computing device. Suitable types of USB ports may be USB-A, USB-B, USB-C, and/or the like.

As shown in FIG. 1, the apparatus 100 may include a video splitter 110 that may access the input video stream 102, for instance, from a video source that is outside of the apparatus 100. The video splitter 110 may be a hardware device and/or software that may split an incoming video stream of data into multiple video streams of data. For instance, the video splitter 110 may duplicate the input video stream 102 to generate the first video stream 104 and the second video stream 106. The video splitter 110 may output the input video stream 102 as the first video stream 104 and may output the duplicated input video stream 102 as the second video stream 106.

As also shown in FIG. 1, the apparatus 100 may include a video switch 112. The video switch 112 may be a hardware device that may include multiple inputs and a single output. The video switch 112 may be controlled to switch between outputting data received from any of the multiple inputs. The video switch 112 may receive the first video stream 104 outputted by the video splitter 110 through one of the multiple inputs into the video switch 112. In some instances, the video splitter 110 may be directly in communication with the video switch 112 through the input into the video switch 112. In other examples, there may be additional components (not shown) through which the first video stream 104 traverses after being outputted from the video splitter 110 and before being inputted into the video switch 112. In any regard, the video switch 112 may output the first video stream 104 outside of the apparatus 100.

According to examples, the video switch 112 may output the first video stream 104 (or equivalently, data representing the first video stream 104) to a monitor, projector, television, display panel, and/or the like. The first video stream 104 may thus be displayed on or through a display device, e.g., monitor, projector screen, television, display panel, and/or the like. Additionally, the first video stream 104 may be displayed at the same resolution as the input video stream 102, e.g., at a relatively high resolution level.

As further shown in FIG. 1, the apparatus 100 may include a video scaler 114 that may scale the second video stream 106. The video scaler 114 may be a hardware and/or a software component that may convert video from one display resolution to another display resolution. For instance, the video scaler 114 may convert the second video stream 106 from a first resolution, e.g., the native resolution, to a second resolution, in which the second resolution is lower than the first resolution. In this regard, the video scaler 114 may downscale the second video stream 106.

In addition, the video scaler 114 may output a scaled version of the second video stream 116. For instance, the video scaler 114 may output the scaled second video stream 116 to a computing device (not shown) that may be located locally with respect to a source of the input video stream 102. The computing device may be a computing device, e.g., a conference room computing device, that may be employed to control various functions within a conference room. The computing device may have executing thereon a video conferencing application and the computing device may upload the scaled second video stream 116 to the video conferencing application. In some examples, the computing device may encode scaled second video stream 116 prior to uploading the video stream to the video conferencing application to enable the video stream to more readily be streamed. The video conferencing application may stream the scaled second video stream 116 to remote participants who are also executing the video conferencing application on their local devices.

Figure 2:
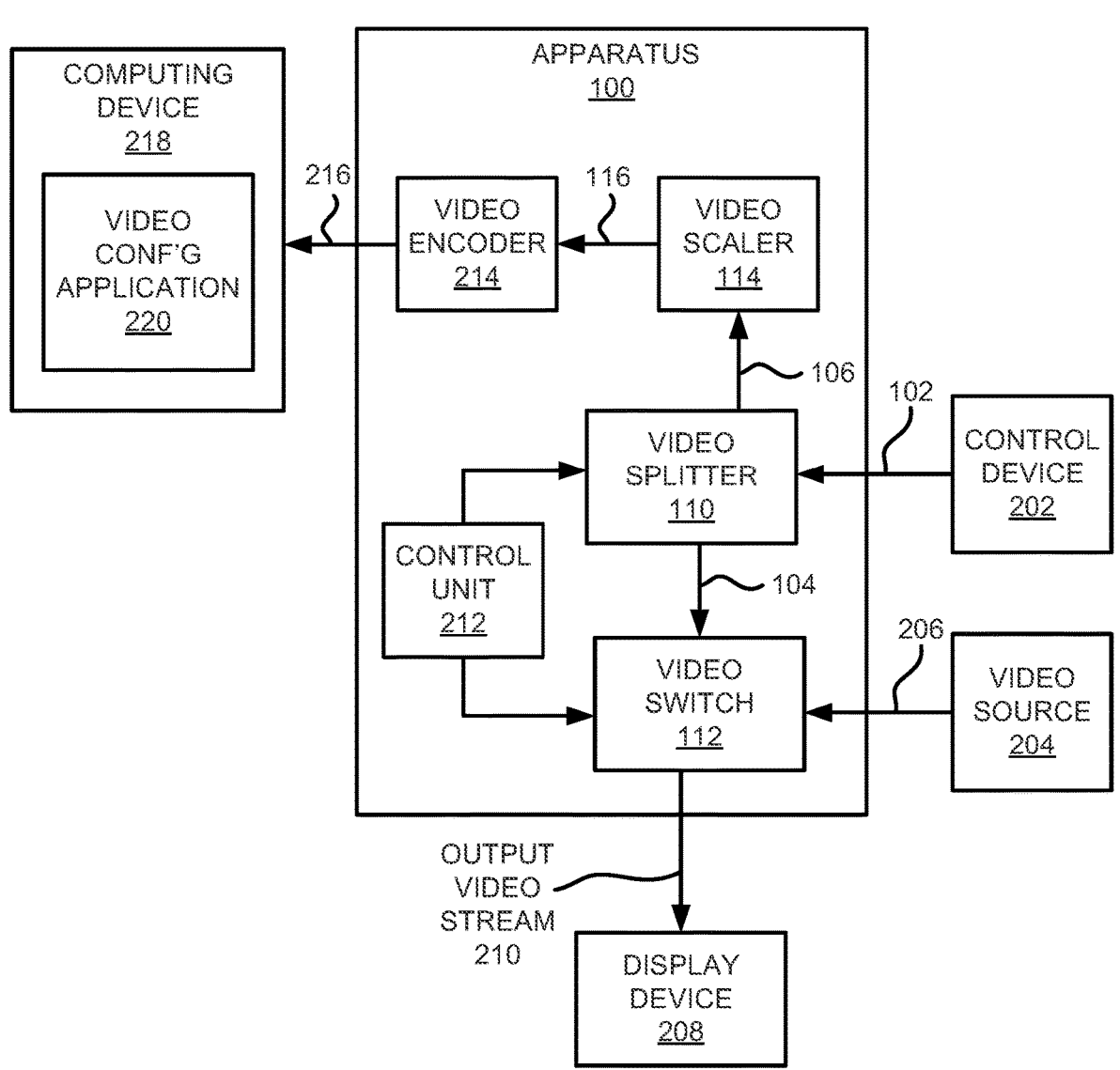
FIG. 2 depicts shows a block diagram of an example system that may include the apparatus depicted in FIG. 1.

Turning now to FIG. 2, there is shown a block diagram of an example system 200 that may include the apparatus 100 depicted in FIG. 1. It should be understood that the example system 200 may include additional features and that some of the features described herein may be removed and/or modified without departing from the scope of the system 200.

As shown in FIG. 2, in addition to the apparatus 100, the system 200 may include a control device 202. In some examples, the control device 202 may be a room controller of a conference room. For instance, the control device 202 may be a device through which a presenter in the conference room may input the input video stream 102 into the apparatus 100. The control device 202 may include a plurality of interfaces through which the control device 202 may receive input data and may output data. The control device 202 may also include a display device, such as a liquid crystal display, a light emitting diode display, or the like, through which users may control various components within a conference room. The various components may include, for instance, lighting, speakers, display devices, projectors, environmental controls, and/or the like.

The control device 202 may include an input through which a presenter may connect their computing device to input the input video stream 102 to the control device 202. The connection between may be, for instance, a display port connection, a high-definition multimedia interface (HDMI) connection, a USB connection, and/or the like. In particular examples, the connection may enable high-resolution video communications, such as 1080p, 4K, 8K, etc. The control device 202 may also communicate the input video stream 102 received from the presenter's computing device to the apparatus 100 as discussed herein.

In some examples, the system 200 may include a plurality of control devices 202 in which the control devices 202 may be daisy-chained together. In these examples, one of the control devices 202 may receive input data and the input data may be communicated across the control devices 202 to the control device 202 that is connected to the apparatus 100. In addition, the control device 202 that is connected to the apparatus 100 may communicate the input data to the apparatus 100. Moreover, the apparatus 100 may be employed to communicate instructions, for instance, from a conference room computing device, to the plurality of control devices 202. The instructions may include, for instance, information that is to be shown on the display devices of the control devices 202.

As also shown in FIG. 2, the system 200 may include a video source 204 that may communicate a second input video stream 206 into the apparatus 100. Particularly, the video source 204 may supply the second input video stream 206 into the video switch 112. The video source 204 may be, for instance, a graphical processing unit of a conference room computing device, e.g., the computing device 218. The video switch 112 may control which of the first video stream 104 and the second input video stream 206 is to be outputted to a display device 208 as an output video stream 210. Particularly, for instance, a control unit 212 may dynamically control the video switch 112 to output the first video stream 104 or the second input video stream 206. The control unit 212 may be an integrated circuit, a microprocessor, semiconductor-based microprocessor, a central processing unit (CPU), an application specific integrated circuit (ASIC), a field-programmable gate array (FPGA), and/or other hardware device. The control unit 212 may also control the video splitter 110 to, for instance, help resolve issues with high definition content protection between devices.

As shown in FIG. 2, the apparatus 100 may also include a video encoder 214 that may receive the second video stream 116 from the video scaler 114. The video encoder 214 may encode the second video stream 116 to generate an encoded video stream 216. The video encoder 214 may compress and change the format of raw video content to a digital file or format such that the video content is compatible for viewing on other devices. As shown in FIG. 2, the video encoder 214 may communicate the encoded video stream 216 to a computing device 218, which may be a conference room computing device 218.

The computing device 218 may have stored thereon a video conferencing application 220. The video conferencing application 220, which may also be termed a video conferencing platform, may enable video to be shared among multiple remote users. Thus, for instance, inclusion of the encoded video stream 216 into the video conferencing application 220 may cause the video conferencing application 220 to communicate the encoded video stream 216 to multiple participants of a conference who are in a common conference call with the video conferencing application 220.

According to examples, the encoded video stream 216 may be at a lower resolution than the first video stream 104. In this regard, the encoded video stream 216 may cause video content to be displayed to remote users of the video conferencing application 220 at a lower resolution than the video content displayed to users who are local to the computing device 218. By way of example, the display device 208, which may be a display device in a conference room, may display the video content corresponding to the input video stream 102 at a 4K resolution. In addition, the display devices of the remote users may display the video content corresponding to the input video stream 102 at a high-definition resolution that is lower than the 4K resolution. The participants of a conference located locally in a conference room and the participants of the conference that are located remotely may thus view the video content simultaneously but at different resolutions with respect to each other.

Various manners in which the apparatus 100 may operate are discussed in greater detail with respect to the method 300 depicted in FIG. 3. Particularly, FIG. 3 depicts a flow diagram of an example method 300 for outputting received video content concurrently at multiple resolutions. It should be understood that the method 300 may include additional operations and that some of the operations described therein may be removed and/or modified without departing from the scope of the method 300. The description of the method 300 is made with reference to the features depicted in FIGS. 1-2 for purposes of illustration. In addition, the use of the terms "first" and "second" throughout the present disclosure should not be construed as denoting order, but instead, these terms are used herein to distinguish certain features from each other.

At block 302, a video splitter 110 may receive an input video stream 102. As discussed herein, the input video stream 102 may be at a first resolution. The first resolution may be a relatively high definition resolution, such as full HD, 4K, 8K, or the like. In addition, a control device 202 may receive the input video stream 102 from a computing device of a presenter and the control device 202 may forward the input video stream 102 to the video splitter 110 in the apparatus 100.

At block 304, the video splitter 110 may split the input video stream 102 into a first video stream 104 and a second video stream 106. The video splitter 110 may split the input video stream 102 in any suitable manner. For instance, the video splitter 110 may split the input video stream 102 by duplicating the input video stream 102.

At block 306, the video splitter 110 may send the first video stream 104 to a video switch 112 and may send the second video stream 106 to a video scaler 114. For instance, the video splitter 110 may send the input video stream 102 as the first video stream 104 to the video switch 112. In addition, the video splitter 110 may send the duplicated input video stream 102 as the second video stream 106 to the video scaler 114.

At block 308, the video switch 112 may output the first video stream 104 to a local display device 208. As discussed herein, the local display device 208 may be a display device that is viewable by participants located within a conference room. In addition, the video switch 112 may receive a second input video stream 206 from a video source 204. The video switch 112 may also switch output of the second input video stream 206 to output of the first video stream 104.

At block 310, the video scaler 114 may scale the second video stream 106 to a scaled video stream 116. The scaled video stream 116 may be downscaled version of the second video stream 106. In addition, at block 312, the video scaler 114 may send the scaled video stream 116 to a video encoder 214. At block 314, the video encoder 214 may encode the scaled video stream 116 to generate an encoded version of the scaled video stream 116. In addition, at block 316, the video encoder 214 may output the encoded scaled video stream 216 to a video conferencing application 220 that is to output the encoded scaled video stream 216 to remote display devices (not shown).

Some or all of the operations set forth in the method 300 may be included as utilities, programs, or subprograms, in any desired computer accessible medium. In addition, the method 300 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a \wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a video switch;
a video scaler; and
a video splitter to:
    access an input video stream, wherein the input video stream is at a first resolution;
    split the accessed input video stream into a first video stream and a second video stream;
    send the first video stream to the video switch;
    send the second video stream to the video scaler;
wherein the video switch is to output the first video stream to a first device, to be displayed at the first resolution, and wherein the video scaler is to:
    scale the second video stream to a second resolution that differs from the first resolution; and
    output the scaled second video stream to a second device, to be displayed at the second resolution.

2. The apparatus of claim 1, further comprising:
a video encoder to:
    receive the second video stream from the video scaler;
    encode the second video stream to generate an encoded video stream; and
    output the encoded video stream from the apparatus to the second device.

3. The apparatus of claim 2, wherein the video encoder is to encode the second video stream to a format that enables the encoded video stream to be communicated through a universal serial bus connection.

4. The apparatus of claim 2, wherein the first device is a local display device and the second device is a computing device, wherein a video conferencing application executing on the computing device is to cause the second video stream to be displayed on a remote display device.

5. The apparatus of claim 1, wherein the first resolution is a higher resolution than the second resolution.

6. The apparatus of claim 1, wherein the apparatus is an expansion card to be inserted into a computing device or a dongle to be connected to a computing device.

7. The apparatus of claim 1, wherein the video switch is also to receive a second input video stream from a video source and wherein the video switch is to switch between output of the first video stream to the first device and output of the second input video stream to the first device.

8. The apparatus of claim 1, further comprising:
a control unit to control the video switch to either output the first video stream or the second video stream.

9. A system comprising:
a computing device;
a video encoder;
a video scaler;
a video switch; and
a video splitter to:
    split an input video stream into a first video stream and a second video stream, wherein the input video stream is at a first resolution;
    send the first video stream to the video switch;
    send the second video stream to the video scaler,
wherein the video switch is to output the first video stream to a display device, to be displayed at the first resolution;
wherein the video scaler is to:
    scale the second video stream to a second resolution that differs from the first resolution; and
    send the second video stream to the video encoder, wherein the video encoder is to encode and output the encoded second video stream to the computing device, to be displayed at the second resolution.

10. The system of claim 9, further comprising:
an apparatus, wherein the apparatus comprises the video encoder, the video switch, and the video splitter; and
a control device to supply the input video stream into the apparatus, wherein the control device is to receive the input video stream from a user computing device.

11. The system of claim 10, wherein the apparatus is to receive a second input video stream from a graphical processing unit of a conference room computing device and wherein the video switch is to switch between output of the second input video stream and output of the first video stream.

12. The system of claim 9, further comprising:

a control unit to control the video splitter and the video switch.

13. The system of claim 9, wherein the video switch is to output the first video stream to the display device in a conference room and the video encoder is to output the encoded second video stream to a video conferencing application, wherein the video conferencing application is to cause a display of the second video stream on a remote display device at the second resolution.

14. A method comprising:

receiving, by a video splitter, an input video stream, wherein the input video stream is at a first resolution;

splitting, by the video splitter, the input video stream into a first video stream and a second video stream;

sending, by the video splitter, the first video stream to a video switch and the second video stream to a video scaler;

outputting, by the video switch, the first video stream to a local display device;

scaling, by the video scaler, the second video stream to a scaled video stream;

sending, by the video scaler, the scaled video stream to a video encoder;

encoding, by the video encoder, the scaled video stream; and outputting, by the video encoder, the encoded scaled video stream to a video conferencing application that is to output the encoded scaled video stream to remote display devices.

15. The method of claim 14, wherein the video switch receives a second input video stream and wherein the method further comprises switching, by the video switch, between outputting of the second input video stream to the local display device and outputting of the first video stream to the local display device.

16. The method of claim 14, wherein a resolution of the scaled video stream corresponds to a highest level of resolution available through the video conferencing application.

17. The method of claim 14, further comprising causing, by the video switch, the local display device to display the first video stream to at least one participant located at a location where a source of the input video stream is located.

18. The method of claim 14, further comprising causing, by the video encoder, the remote display devices to display a video stream based on the encoded scaled video stream to at least one participant located remote from a location where a source of the input video is located.

19. The method of claim 14, wherein a resolution of the first video stream is higher than a resolution of the scaled video stream.

20. The method of claim 14, wherein the resolution of the first video stream is a native resolution of the input video stream.

* * * * *